United States Patent [19]

Dixon

[11] Patent Number: 4,887,992

[45] Date of Patent: Dec. 19, 1989

[54] ALTERNATOR BELT TENSION ADJUSTOR

[76] Inventor: Jay J. Dixon, R.R. 1, Coal City, Ill. 60416

[21] Appl. No.: 151,069

[22] Filed: Feb. 1, 1988

[51] Int. Cl.[4] .............................................. F16H 7/14
[52] U.S. Cl. .................................... 474/101; 474/114
[58] Field of Search ............... 474/101, 109, 111, 112, 474/113, 114, 119

[56] References Cited

U.S. PATENT DOCUMENTS

| | | | |
|---|---|---|---|
| 630,833 | 8/1899 | Johnston | 474/113 |
| 1,141,539 | 6/1915 | Greer et al. | 474/112 |
| 2,368,362 | 1/1945 | Johnstone | 474/114 X |
| 3,004,443 | 10/1961 | Gerrans | 474/114 X |
| 3,430,507 | 3/1969 | Hurst et al. | 474/113 |
| 4,583,961 | 4/1986 | Kawasawa et al. | 474/113 |
| 4,826,469 | 5/1989 | Cooley | 474/101 |

Primary Examiner—Jerome W. Massie, IV
Assistant Examiner—Matthew Smith

[57] ABSTRACT

An alternator belt tension adjuster for conventional alternators and standard sloted brackets including a rack mounted adjacent the bracket slot engaged by a pinion and fastener extended through the slot into the alternator.

9 Claims, 2 Drawing Sheets

ALTERNATOR BELT TENSION ADJUSTOR

BACKGROUND OF THE INVENTION

Slotted alternator brackets have been in common use for over the last thirty years for receiving an alternator carried fastener that permits the alternator when the fastener is loosened to pivot as the fastener slides in the slot to tension the alternator belt. When the proper tension is achieved the fastener is retightened locking the alternator in the adjusted position with the proper belt tension.

This procedure usually includes the use of either a large screwdriver, wrench or bar to assist the mechanic in providing pressure to the housing of the alternator to achieve sufficient leverage in pivoting the alternator to properly tension the belt.

While various leverage achieving mechanisms including gearing have been suggested in the past for adjusting alternator belt tension, as well as belt tensioning applications in general, these have not achieved any considerable degree of commercial success in the automotive alternator environment for two reasons. One is the mechanisms have been difficult to use and since the prior method of utilizing a tool to leverage the alternator is not overly complex, the mechanic certainly would not substitute a more complicated procedure for one that is simpler.

The second reason these prior belt tensioning devices have not achieved any material success in the automotive alternator application is because of their extreme complexity, they add a sufficient cost increment to the tensioning device that makes them unattractive for the high volume OEM automobile market.

One such alternator belt tensioning mechanism is shown in the Hurst et al. U.S. Pat. No. 3,430,507 which illustrates a pivotally mounted generator that has a bolt fixed to one side of its housing extending through a slot in an adjustable bracket having a rack on its outer periphery. A pinion mounted separately from the bracket or strap and also separately from the alternator engages the rack to provide adjustability while the fastener holds the bracket tightly to the alternator. Because the pinion is mounted separately from the bracket and the alternator the assembly is very complex, expensive to manufacture and also increases the envelope required in the engine compartment.

There are also a plurality of treaded fastener tension adjusting mechanisms adjacent alternator bracket slots wherein the threaded fasteners are carried by a bracket fixed to the alternator adjacent the bracket slot. Such mechanisms are illustrated in the Shiki, et al. U.S. Pat. Nos. 3,922,927, the Brenneman 4,512,752, and the Isobe, et al. 4,571,221.

There are also a plurality of general purpose rack and pinion or chain belt tightening mechanism but none are adapted to be compatible with conventional alternator brackets. These include the ones shown in the Johnston U.S. Pat. Nos. 630,833, the Moran 687,252, the Swift 2,074,078, the Hupp 2,709,493 and the Gerrans 3,004,443. Other general purpose belt tighteners are shown in the Aikman U.S. Pat. Nos. 2,184,541, the Sauer 2,205,176 and the Estes 2,970,587.

It is the primary object of the present invention to ameliorate the problems noted above in vehicular alternator belt tensioning devices.

SUMMARY OF THE PRESENT INVENTION

In accordance with the present invention an alternator belt tension adjuster assembly is provided for conventional alternators and standard slotted alternator brackets, including a rack mounted directly adjacent the bracket slot engaged by a coaxial pinion and separate fastener extending through the slot into the alternator.

A hexagonal projection extending outwardly from and integrally formed with the pinion receives a standard wrench for rotating the pinion and adjusting alternator position. The only added parts in the present belt tensioning system over conventional OEM alternator brackets are the pinion and the rack which by themselves are relatively low in cost. The pinion is held in engagement with the rack and is locked and unlocked in position by a hexagonal head bolt that is already standard in these OEM slotted alternator brackets. This bolt freely passes through the pinion into a standard threaded aperture in the alternator housing.

When it is desired to adjust alternator belt tension, the mechanic loosens the standard fastener thereby freeing the pinion, and applies a wrench to the pinion hexagonal projection rotating the pinion and pivoting the alternator to the desired adjusted position. Holding the tension on the belt with this wrench, he then applies another wrench to the head of the hexagonal fastener and tightens it locking both the pinion and alternator in position in a very simple and improved fashion.

Other objects and advantages of the present invention will appear in the following detailed description of the invention.

DETAILED DESCRIPTION OF THE PREFERRED EMBODIMENT

Figure 1:
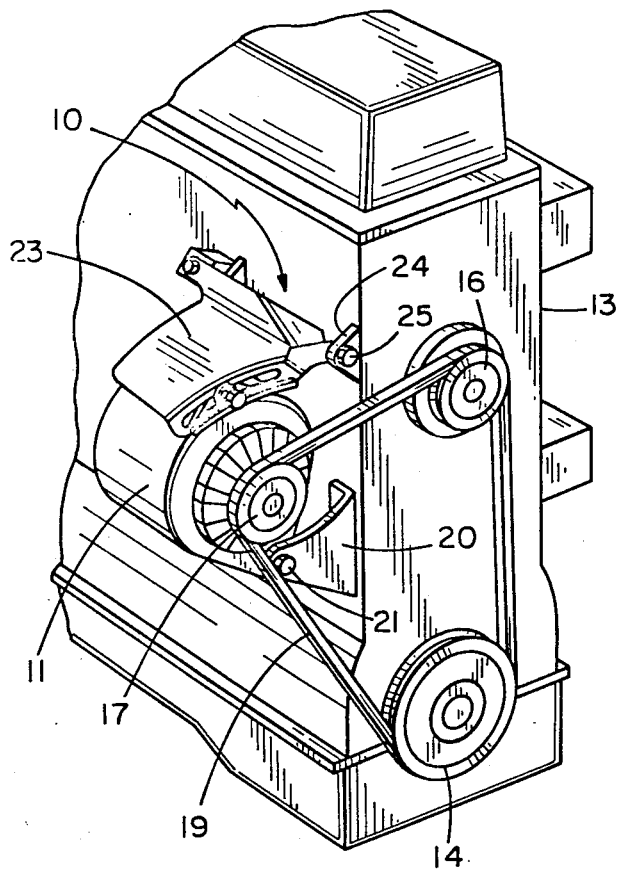
FIG. 1 is a perspective fragmentary view of an automobile engine with the present alternator belt tension adjuster in its operative position relative to a standard alternator.

Referring to the drawings and particularly FIGS. 1 to 4, the present alternator belt tension adjuster 10 is illustrated holding a conventional alternator 11 in position on an engine 13 having a crankshaft driven pulley 14, driving a camshaft pulley 16 and an alternator pulley 17 through a reinforced conventional rubber belt 19.

The alternator 11 is fixed to engine block bracket 20 by pivotal fastener 21 and bracket 23 is in turn fastened to block 13 sub-bracket 24 by pivotal fastener 25. The fastener 21, because it is generally below the pulley 17, permits the alternator pulley 17 to be moved in a generally horizontal direction or transverse to a line connecting pulleys 14 and 16 to give maximum belt tensioning advantage during the adjustment procedure.

Figure 2:
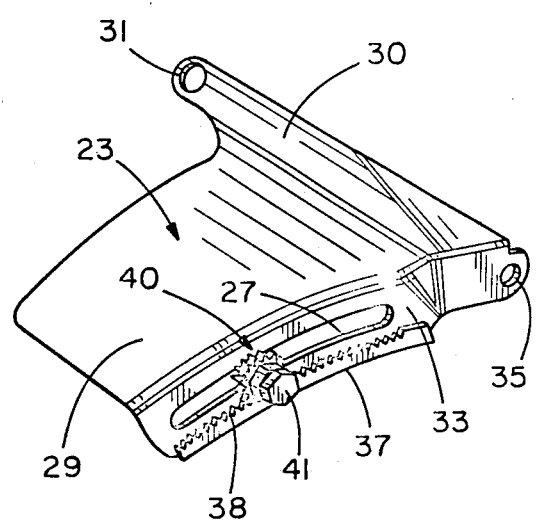
FIG. 2 is an enlarged subassembly of the present alternator belt tension adjuster and bracket.
Figure 3:
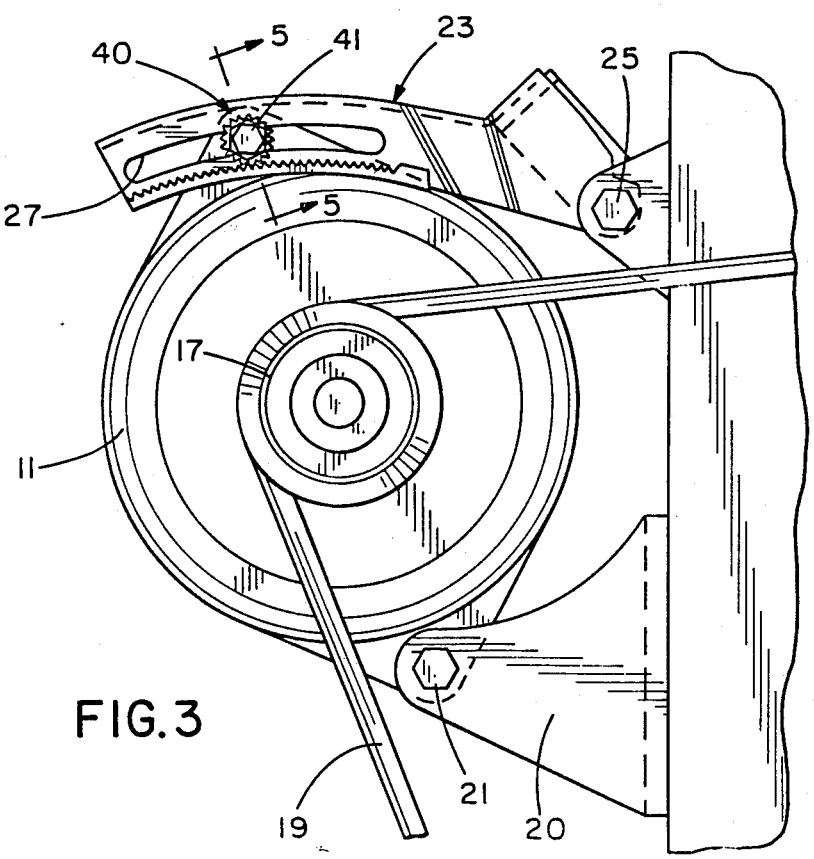
FIG. 3 is an enlarged front view of the engine and alternator illustrated in FIG. 1 with the present alternator belt tension adjuster.

As seen in FIGS. 1 and 2, bracket 23 is conventional in shape including arcuate slot 27 therein. In fact, the bracket 23 including slot 27 is a conventional General Motors alternator bracket, of course without the present belt tensioning mechanism associated therewith. Bracket 23 includes a general planar slightly arcuate panel 29 with an upwardly depending flange 30 at one end thereof with a fastener receiving aperture 31 for attachment to the block, and a downwardly extended flange 33 at the adjacent or forward side thereof that has an aperture 35 for receiving the fastener 25, and the arcuate slot 27 therein.

The belt tension adjuster 10 includes an elongated arcuate rack gear 37 fastened to the lower edge of bracket flange 33 immediately below slot 27 having teeth 38 projecting therefrom. Gear 37 may be attached to the bracket 23 by welding if desired, or alternatively it may be cast integrally with the bracket 23, although presently the brackets 23 are formed by stamping which of course would lend itself to the preference of welding rack 37 to the bracket.

Figure 4:
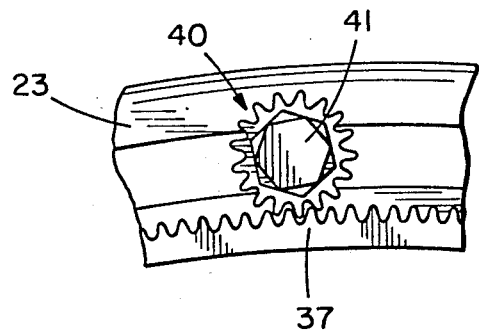
FIG. 4 is a fragmentary front view of the present alternator belt tension adjuster and bracket.
Figure 5:
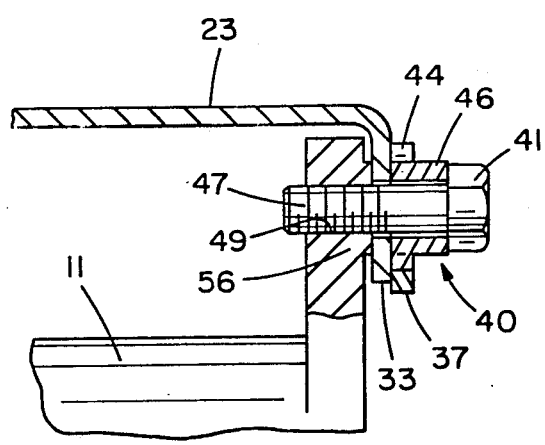
FIG. 5 is a fragmentary section of the pinion assembly and locking device taken generally along line 5—5 of FIG. 3.
Figure 6:
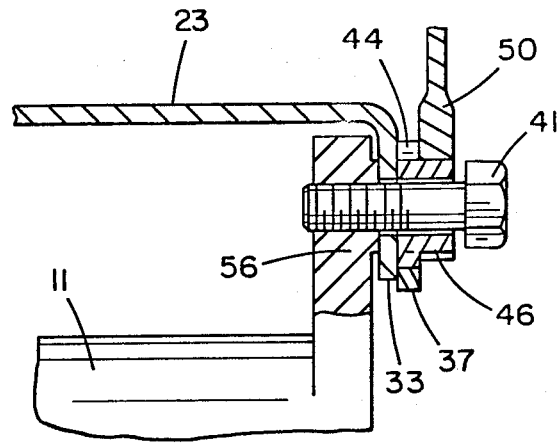
FIG. 6 is a fragmentary section similar to FIG. 5 with the fastener loosened and a wrench applied to the pinion for rotation thereof.

A pinion assembly 40 is held in position by a fastener 41 which is a hexagonal head bolt identical to that presently utilized with standard OEM brackets 23. The pinion assembly 41 as seen in FIGS. 4, 5 and 6 includes a 360 degree toothed pinion 44 engaging the teeth on rack 37 and forwardly projecting integral hexagonal projection 46. Bolt 41 has a threaded portion 47 threadedly engaged with a threaded aperture 49 already provided in conventional alternators.

Figure 7:
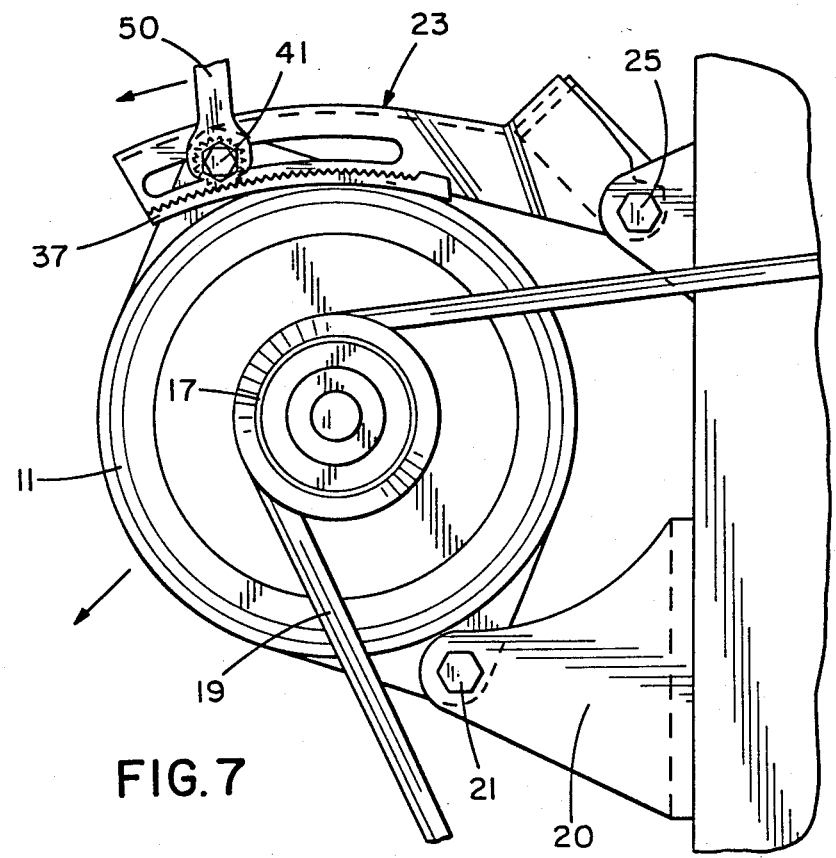
FIG. 7 is a front view similar to FIG. 3 with a wrench applied to the pinion rotating the pinion in a direction to pivot the alternator outwardly to increase tension on the alternator belt.

During the belt tensioning procedure, fastener 41 is loosened as illustrated in FIG. 6 and a conventional open-ended wrench 50 is applied to hexagonal projection 46 and rotated in a counter-clockwise direction as viewed from the front as seen in FIG. 7, to rotate pinion 44 and walk the pinion and the alternator carried thereby outwardly away from the engine block further tensioning belt 19. Pinion assembly 40 is freely rotatable on bolt 4 when the latter is loosened. Holding wrench 50 in the desired adjusted position, the mechanic then applies another wrench to fastener 41 rotating it of course in the opposite or clockwise direction to tighten and lock the pinion assembly 40 against the bracket flange 33, and at the same time bringing bracket flange 33 into engagement with alternator boss 56 locking the alternator in its adjusted position.

It is important to note in accordance with the present invention that fastener 41, while not only required in present alternator brackets having no leverage adjustment mechanisms, performs a three-fold function. Firstly, it supports the pinion assembly 40 for rotation; secondly, it releasably locks the pinion assembly in position; and thirdly, it performs its original function of locking the alternator 11 in its adjusted position.

While the present alternator belt tension mechanism is primarily designed for incorporation into vehicles as original equipment, it nevertheless has the significant advantage of being capable of being retrofitted into existing alternator bracket installations. That is, it is only necessary to remove the standard automobile alternator bracket from the vehicle, weld rack 37 thereto and install the pinion assembly 40 in position with the original bracket and fastener.

I claim:
1. An alternator belt tension adjusting mechanism for alternator brackets and alternators, comprising; a fixed bracket including a slightly arcuate planar panel with a slightly elongated integral arcuate flange depending therefrom at one end with a first pivot mounting hole adapted to attach the bracket to a fixed support and with an arcuate elongated slot in the flange for an alternator with a pivot hole at one side thereof, a tension hole at the opposite side thereof and a central forwardly extending pulley, a fastener extending through the elongated slot in the bracket flange into the tension hole so it is radially fixed with respect to the alternator and also radially fixed transverse to the bracket slot, a fixed arcuate rack mounted on the flange directly adjacent and along but outside the slot therein, a pinion freely rotatably mounted directly on the fastener in engagement with the rack, adjacent but not in the slot, and means for rotating the pinion with respect to the rack to vary the tension on the alternator belt, said fastener providing the sole radial support for the pinion so the pinion is unsupported by the bracket slot.

2. An alternator belt tension adjusting mechanism for conventional alternator brackets and alternators, as defined in claim 1, wherein the pinion is rotatably mounted on the fastener, said fastener being constructed to selectively lock the pinion from rotation with respect to the rack to hold the alternator in an adjusted position.

3. An alternator belt tension adjusting mechanism for conventional alternator brackets and alternators as defined in claim 1, wherein a hexagonal projection is formed integrally with the pinion whereby the pinion may be rotated by a conventional wrench applied to the hexagonal projection.

4. An alternator belt tension adjusting mechanism for conventional alternator brackets and alternators, as defined in claim 1, wherein the fastener is a hexagonal head bolt with the head on the side of bracket flange opposite the alternator.

5. An alternator bracket and tension adjusting assembly, comprising; a fixed bracket having an integral elongated flange adapted to be fixed adjacent the alternator, with an elongated slot in the flange, an elongated rack gear fixedly mounted on the elongated bracket flange adjacent but outside the slot, a coaxial pinion assembly and locking device extending through the bracket slot and engaging an aperture in the alternator for engaging the rack and shifting the alternator to a desired position to properly tension an alternator belt and thereafter to lock the pinion and alternator in fixed positions, said pinion assembly and locking device including a pinion freely rotatably mounted adjacent but not in the slot, and a fastener fixed with respect to the alternator and fixed with respect to the bracket in a direction transverse to the slot for radially positioning and supporting the pinion so the pinion is unsupported in the bracket slot.

6. An alternator bracket and tension adjusting assembly as defined in claim 5, wherein the pinion assembly and locking device includes a pinion engaging the rack with an integral hexagonal projection extending outwardly from the pinion adapted to receive a conventional wrench to rotate the pinion.

7. An alternator bracket and tension adjusting assembly as defined in claim 5, wherein the pinion assembly and locking device includes a conventional hexagonal fastener extending through the pinion and the bracket slot into the alternator so that the fastener locks the pinion from rotation and also locks the alternator in position.

8. An alternator bracket and tension adjusting assembly, comprising; a fixed bracket having an integral elongated flange adapted to be fixed adjacent the alternator, with an elongated slot in the flange, an elongated rack gear fixedly mounted on the bracket flange adjacent but outside the slot, and a coaxial pinion assembly and locking device extending through the bracket slot and engaging an aperture in the alternator for engaging the rack and shifting the alternator to a desired position to properly tension an alternator belt and thereafter to lock the pinion and alternator in fixed positions, the pinion assembly and locking device including a pinion freely rotatably mounted separately from the slot engaging the rack with an integral hexagonal projection extending outwardly from the pinion adapted to receive a conventional wrench to rotate the pinion, the pinion assembly and locking device also including a conventional hexagonal fastener extending through the pinion and the bracket slot into the alternator so that the fastener locks the pinion from rotation and also locks the alternator in position, said fastener being fixed with respect to the alternator and fixed with respect to the bracket in a direction transverse to the slot, said fastener providing the sole radial support for the pinion so the pinion is unsupported by the bracket slot.

9. An alternator bracket and tension adjusting assembly, comprising; a fixed bracket having an integral elongated flange on one side thereof adapted to be fixed adjacent the alternator, with an elongated arcuate slot in the bracket flange thereon, an elongated rack gear fixedly mounted on the bracket adjacent but outside the arcuate slot, and a coaxial pinion assembly and locking device extending through the bracket arcuate slot and engaging an aperture in the alternator for engaging the rack and shifting the alternator to a desired position to properly tension an alternator belt and thereafter to lock the pinion and alternator in fixed positions, the pinion assembly and locking device including a pinion freely rotatably mounted separate from the slot engaging the arcuate rack with an integral hexagonal projection extending outwardly from the pinion adapted to receive a conventional wrench to rotate the pinion, the pinion assembly and locking device also including a conventional hexagonal fastener extending through the pinion and the bracket slot into the alternator so that the fastener locks the pinion from rotation and also locks the alternator in position, said fastener being fixed with respect to the alternator and fixed with respect to the bracket in a direction transverse to the slot, said fastener providing the sole radial support for the pinion so the pinion is unsupported by the bracket slot.

* * * * *